US012560944B2

(12) United States Patent
Teisberg et al.

(10) Patent No.: US 12,560,944 B2
(45) Date of Patent: Feb. 24, 2026

(54) CORRELATED MOTION AND DETECTION FOR AIRCRAFT

(71) Applicant: SCIENTIFIC APPLICATIONS AND RESEARCH ASSOCIATES, INC., Cypress, CA (US)

(72) Inventors: Thomas O. Teisberg, Menlo Park, CA (US); Rohit H. Sant, San Mateo, CA (US); Matthew O. Derry, Ann Arbor, MI (US); Michael J. Demertzi, Half Moon Bay, CA (US); Gavin K. Ananda Krishnan, San Carlos, CA (US); Keenan A. Wyrobek, Half Moon Bay, CA (US); Vasumathi Raman, San Francisco, CA (US); Brendan J.D. Wade, San Francisco, CA (US); Blair R. Hagen, Pacifica, CA (US); Randall R. Patterson, Littleton, CO (US); Philip M. Green, Sunnyvale, CA (US)

(73) Assignee: SCIENTIFIC APPLICATIONS AND RESEARCH ASSOCIATES, INC., Cypress, CA (US)

( * ) Notice: Subject to any disclaimer, the term of this patent is extended or adjusted under 35 U.S.C. 154(b) by 549 days.

(21) Appl. No.: 17/138,285

(22) Filed: Dec. 30, 2020

(65) Prior Publication Data

US 2022/0011786 A1      Jan. 13, 2022

Related U.S. Application Data

(60) Provisional application No. 63/082,821, filed on Sep. 24, 2020, provisional application No. 63/021,633, (Continued)

(51) Int. Cl.
*G05D 1/00*          (2024.01)
*G06N 3/02*          (2006.01)
(Continued)

(52) U.S. Cl.
CPC ......... *G05D 1/1064* (2019.05); *G05D 1/0094* (2013.01); *G06N 3/02* (2013.01);
(Continued)

(58) Field of Classification Search
CPC .... G05D 1/1064; G05D 1/0088; G05D 1/104; G05D 1/0202–0204; G05D 1/622–637;
(Continued)

(56) References Cited

U.S. PATENT DOCUMENTS 2,663,518 A    12/1953  Glenn
3,444,508 A     5/1969  Granfors et al.
(Continued)

FOREIGN PATENT DOCUMENTS

EP          1571875 A2     9/2005
EP          1946606 B1    11/2010
(Continued)

OTHER PUBLICATIONS

Behjat, A., Gabani, K., and Chowdhury, S., "Training Detection-Range-Frugal Cooperative Collision Avoidance Models for Quad-copters via Neuroevolution", May 31, 2019. doi:10.48550/arXiv. 1906.00052. (Year: 2019).*
(Continued)

*Primary Examiner* — Erin M Piateski
*Assistant Examiner* — Paul Allen
(74) *Attorney, Agent, or Firm* — STETINA GARRED BRUCKER & NEWBOLES

(57) ABSTRACT

An acoustic detection system of an aircraft receives a first signal, where the first signal is a multichannel audio signal. The multichannel audio signal is determined to be associated with at least one intruding aircraft based on the multichannel audio signal. An avoidance maneuver is commanded for the aircraft based on a track of the intruding aircraft generated based on the multichannel audio signal and a second signal
(Continued)

providing additional information about the intruding aircraft.

19 Claims, 7 Drawing Sheets

Related U.S. Application Data filed on May 7, 2020, provisional application No. 62/984,266, filed on Mar. 2, 2020, provisional application No. 62/955,946, filed on Dec. 31, 2019.

(51) Int. Cl.
 *H04R 1/32* (2006.01)
 *H04R 29/00* (2006.01)

(52) U.S. Cl.
 CPC ........... *H04R 1/326* (2013.01); *H04R 29/005* (2013.01); *H04R 2499/13* (2013.01)

(58) Field of Classification Search
 CPC ...... G05D 1/689; H04R 1/326; H04R 29/005; H04R 2499/13; G08G 5/04–045; G08G 5/00; G08G 7/00; G01S 1/00; G01S 3/00; B64C 39/00
 USPC ........................................ 701/2–18, 300–302
 See application file for complete search history.

(56) References Cited

U.S. PATENT DOCUMENTS

| | | | |
|---|---|---|---|
| 3,893,061 A | | 7/1975 | Slawsky et al. |
| 3,964,694 A | | 6/1976 | Metzger et al. |
| 4,106,740 A | | 8/1978 | Lloyd et al. |
| 4,509,151 A | | 4/1985 | Anderson |
| 4,622,657 A | | 11/1986 | Clare |
| 4,811,308 A | | 3/1989 | Michel |
| 4,831,874 A | | 5/1989 | Daubin et al. |
| 4,926,171 A | | 5/1990 | Kelley |
| 4,974,213 A | | 11/1990 | Siwecki |
| 5,062,085 A | | 10/1991 | Andrews, Jr. |
| 5,111,400 A | | 5/1992 | Yoder |
| 5,150,336 A | | 9/1992 | Sullivan et al. |
| 5,177,316 A | | 1/1993 | Honigsbaum |
| 5,410,519 A | | 4/1995 | Hall et al. |
| 5,477,506 A | | 12/1995 | Allen |
| 5,563,849 A | | 10/1996 | Hall et al. |
| 5,575,438 A | | 11/1996 | Mcgonigle et al. |
| 5,617,371 A | | 4/1997 | Williams |
| 5,699,437 A | | 12/1997 | Finn |
| 5,748,143 A | | 5/1998 | Melvin, Jr. |
| 5,861,846 A | | 1/1999 | Minter |
| 5,901,232 A | | 5/1999 | Gibbs |
| 5,909,409 A | | 6/1999 | Barber et al. |
| 5,995,445 A | | 11/1999 | Whitesell et al. |
| 6,201,482 B1 | | 3/2001 | Schiefele et al. |
| 6,288,973 B1 | | 9/2001 | Joynes |
| 6,588,701 B2 | | 7/2003 | Yavnai |
| 6,621,764 B1 | | 9/2003 | Smith |
| 6,705,573 B2 | | 3/2004 | Mcdonnell |
| 6,760,449 B1 | | 7/2004 | Matsuo |
| 6,795,772 B2 | | 9/2004 | Lin et al. |
| 6,804,607 B1 | | 10/2004 | Wood |
| 6,857,601 B2 | | 2/2005 | Akahori |
| 6,859,420 B1 | | 2/2005 | Coney et al. |
| 6,970,796 B2 | | 11/2005 | Tashev |
| 7,079,450 B2 | | 7/2006 | Breed et al. |
| 7,149,147 B1 | | 12/2006 | Goldman et al. |
| 7,209,221 B2 | | 4/2007 | Breed et al. |
| 7,228,232 B2 | | 6/2007 | Bodin et al. |
| 7,372,773 B2 | | 5/2008 | Horak |
| 7,457,619 B2 | | 11/2008 | Ariyur et al. |
| 7,548,488 B2 | | 6/2009 | Horak et al. |
| 7,606,115 B1 * | | 10/2009 | Cline .................... G08G 5/045 |
| | | | 367/136 |
| 7,720,232 B2 | | 5/2010 | Oxford |
| 7,751,976 B2 | | 7/2010 | Matuska et al. |
| 7,818,127 B1 | | 10/2010 | Duggan et al. |
| 7,975,959 B2 | | 7/2011 | Perry et al. |
| 7,991,167 B2 | | 8/2011 | Oxford |
| 8,809,755 B1 | | 8/2014 | Patel et al. |
| 10,032,111 B1 | | 7/2018 | Bertram et al. |
| 10,379,534 B2 * | | 8/2019 | Visser .................... G05D 1/101 |
| 11,262,746 B1 * | | 3/2022 | Van Duren ........... B64U 20/80 |
| 11,659,322 B1 * | | 5/2023 | Woodworth ......... G05D 1/0022 |
| | | | 701/2 |
| 2003/0185410 A1 | | 10/2003 | June et al. |
| 2004/0105557 A1 | | 6/2004 | Matsuo |
| 2004/0165736 A1 | | 8/2004 | Hetherington et al. |
| 2004/0252845 A1 | | 12/2004 | Tashev |
| 2005/0271221 A1 | | 12/2005 | Cerwin |
| 2009/0184862 A1 | | 7/2009 | Stayton et al. |
| 2010/0100269 A1 * | | 4/2010 | Ekhaguere ........... G08G 5/0086 |
| | | | 701/26 |
| 2010/0121574 A1 | | 5/2010 | Ariyur et al. |
| 2011/0103612 A1 * | | 5/2011 | Chou .................... H04R 3/005 |
| | | | 381/92 |
| 2012/0092208 A1 | | 4/2012 | Lemire et al. |
| 2015/0302858 A1 | | 10/2015 | Hearing et al. |
| 2016/0068267 A1 * | | 3/2016 | Liu ..................... G05D 1/0088 |
| | | | 701/4 |
| 2016/0091362 A1 | | 3/2016 | Schmitz et al. |
| 2016/0247405 A1 * | | 8/2016 | Paczan ..................... G08G 5/57 |
| 2016/0247407 A1 | | 8/2016 | Paczan et al. |
| 2017/0092138 A1 | | 3/2017 | Trundle et al. |
| 2017/0219686 A1 * | | 8/2017 | Xie ......................... G01S 11/14 |
| 2017/0220036 A1 * | | 8/2017 | Visser ................... G08C 23/02 |
| 2017/0364776 A1 * | | 12/2017 | Micks .................. G01S 17/006 |
| 2018/0018970 A1 * | | 1/2018 | Heyl .................... G06V 40/172 |
| 2018/0095714 A1 | | 4/2018 | Taylor et al. |
| 2019/0018130 A1 * | | 1/2019 | Griggs ................. G01S 13/87 |
| 2019/0095687 A1 * | | 3/2019 | Shaw .................. A61B 5/1079 |
| 2019/0114564 A1 * | | 4/2019 | Ferguson ......... G06Q 10/06315 |
| 2019/0341054 A1 * | | 11/2019 | Krupka ............. G06V 10/764 |
| 2020/0103499 A1 * | | 4/2020 | Preece ..................... G06N 3/04 |
| 2021/0192748 A1 * | | 6/2021 | Morales Morales .. G06V 10/82 |
| 2021/0233416 A1 * | | 7/2021 | John ...................... B64C 13/20 |
| 2022/0122576 A1 * | | 4/2022 | John ................... G05D 1/0094 |
| 2023/0028792 A1 * | | 1/2023 | Cocaud ............... G08G 5/0039 |

FOREIGN PATENT DOCUMENTS

| | | | | |
|---|---|---|---|---|
| GB | 2309301 A | | 7/1997 | |
| GB | 2350425 B | | 3/2003 | |
| GB | 2380244 A | | 4/2003 | |
| JP | 2002039851 A | | 2/2002 | |
| JP | 2006319789 A | | 11/2006 | |
| JP | 2017501475 A | | 1/2017 | |
| JP | 2018090117 A | | 6/2018 | |
| JP | 2019505047 A | | 2/2019 | |
| JP | 2019105891 A | | 6/2019 | |
| KR | 100520786 B1 | | 10/2005 | |
| KR | 20060011064 A | | 2/2006 | |
| KR | 101879673 B1 * | | 7/2018 | ............ G01B 21/20 |
| WO | 9602905 A1 | | 2/1996 | |
| WO | 2005006009 A2 | | 1/2005 | |
| WO | 2005012079 A1 | | 2/2005 | |
| WO | 2006113104 A2 | | 10/2006 | |
| WO | 2019221613 A1 | | 11/2019 | |

OTHER PUBLICATIONS

Tirtle et al.—The Predator ADTC, A Case Study for Transition Planning to the Formal Acquisition Process, National Defense Research Institute, RAND, 1997 (Year: 1997).*

Fahy, F. J. et al. and Leighton, T.G.—Fundamentals of Noise and Vibration, Chapter 7: Fundamentals of underwater acoustics. E & FN Spon, 1998 (Year: 1998).*

Hald et al.—A novel beamformer array design for noise source location from intermediate measurement distances, Bruel & Kjaer

(56) References Cited

OTHER PUBLICATIONS

Sound & Vibration Measurement A/S, 2002 (Year: 2002).*
Batel et al.—Noise Source Location Techniques—Simple to Advanced Application, Sound and Vibration, Mar. 2023 (Year: 2003).*
Shin Jae Choul—English description of KR-101879673-B1 via Espacenet Patent Translate, retrieved Oct. 14, 2025 (Year: 2025).*
"International Search Report and Written Opinion for PCT/US2020/067495", mailed Mar. 25, 2021.
Andersson, Sean et al. "Robot Phonotaxis with Dynamic Sound-source Localization," Proceedings of the 2004 IEEE, Int'l Conf. on Robotics & Automation, 2004.
Barfield, Finley, "Autonomous Collision Avoidance the Technical Requirements," Proc. of the IEEE 2000, Nat'l Aerospace and Elecs. Conf., 808-813, 2000.
Becker, Gunnar, "Non-Cooperative Helicopter Detection by Acoustical Sensors," RTO Meeting Proceedings 6, Symposium of the RTO Systems Concepts and Integration Panel (SCI) held in Mannheim, Germany, 1998.
Boucek, G. Jr. et al. "Traffic Alert and Collision Avoidance System," Final Report, U.S. Dep't of Transp., FAA, 1985.
Buckingham, Michael et al. "Propeller Noise from a Light Aircraft for Low-Frequency Measurements of the Speed of Sound in a Marine Sediment," J. Computational Acoustics, 10(4): 445-464, 2002.
Carneal, James et al. "Comparison of a Diffracting and a Non-Diffracting Circular Acoustic Array," 2006 IEEE Int'l Conf. on Acoustics Speech and Signal Processing Proceedings, 2006.
Clark, Timothy, "Evaluation of a Two-way Datalink for Airborne Surveillance of and Communication with a Remotely Operated Aircraft Operating in the National Airspace System," TRACE, Master's Thesis, Univ. of Tenn. 2002.
Cross, J. "Y0-3A Acoustics Research Aircraft Systems Manual," NASA Technical Memorandum 85968, 1984.
Cross, Jeffrey et al. "In-Flight Acoustic Testing Techniques Using the Y0-3A Acoustic Research Aircraft," NASA Technical Memorandum 85895, 1984.
Cruz, Nuno et al. "Operations with Multiple Autonomous Underwater Vehicles: the PISCIS Project," Symposium AINS, 2003.
Damarla, Raju et al. "An algorithm for classifying multiple targets using acoustic signatures," Proc. of SPIE 5429, Signal Processing, Sensor Fusion, and Target Recognition XIII, 5429: 421-427, 2004.
Depireux, D. et al. Vehicle Classification Using a Biological Model of Hearing, Insitute for Systems Research University of Maryland College, 2000.
Dougherty, Robert, "Extensions of DAMAS and Benefits and Limitations of Deconvolution in Beamforming," 11th AIAA/CEAS Aeroacoustics Conference, 2005.
Duckworth, Gregory et al. "Acoustic counter-sniper system," Proc. of SPIE 2938, Command, Control, Communications, and Intelligence Systems for Law Enforcement, 2938: 262-275, 1997.
Erzberger, Heinz et al. "Concept for Next Generation Air Traffic Control System," Air Traffic Control Quarterly, 10(4) 355-378, 2002.
Erzberger, Heinz, "Automated Conflict Resolution for Air Traffic Control," ICAS 2006, 25th Int'l Cong. of the Aeronautical Scis., 2006.
Erzberger, Heinz, "Transforming the NAS: The Next Generation Air Traffic Control System," ICAS 2004, 24th Int'l Cong. of the Aeronautical Scis., 2004.
Ferguson, Brian et al. "Detection and Localisation of a Ground Based Impulsive Sound Source using Acoustic Sensors Onboard a Tactical Unmanned Aerial Vehicle," Battlefield Acoustic Sensing for ISR Applications, 16-1-16-8, 2006.
Ferguson, Brian et al. "Locating far-field impulsive sound sources in air by triangulation," J. Acoust. Soc. Am., 111(1), 104-116, 2002.
Ferguson, Brian et al. "Turboprop and rotary-wing aircraft flight parameter estimation using both narrow-band and broadband passive acoustic signal-processing methods," J. Acoust. Soc. Am., 108, 4, 1763-1771, 2000.

Ferguson, Brian. "A ground-based narrow-band passive acoustic technique for estimating the altitude and speed of a propeller-driven aircraft," J. Acoust. Soc. Am., 92(3), 1403-1407, 1992.
Freitag, Lee et al. "The WHOI Micro-Modem: An Acoustic Communications and Navigation System for Multiple Platforms," Proc. of OCEANS 2005 MTS/IEEE, 2, 1086-1092, 2005.
Gade, S. et al. "190 A Review of Array Techniques for Noise Source Location," JSAE Spring Convention, 2003.
Glegg, Stewart et al. "A Passive Sonar System Based on an Autonomous Underwater Vehicle," IEEE J. Oceanic Eng'g, 26(4): 700-710, 2001.
Gunnar Becker and Alwin Güdesen, Passive sensing with acoustics on the battlefield, Applied Acoustics 59:149-178 (2000).
Haering, Edward A. et al. "Preliminary Airborne Measurements for the SR-71 Sonic Boom Propagation Experiment," NASA Technical Memorandum 104307, 1995.
Hald, J. "An Integrated NAH/Beamforming Solution for Efficient Broad-Band Noise Source Location," SAE 2005 Noise and Vibration Conference and Exhibition, 2005-01-2537, 2005.
Hald, Jørgen et al. "Combined NAH and Beamforming Using the Same Microphone Array," Sound and Vibration, 2004.
He, Zhihai et al. "Vision-Based UAV Flight Control and Obstacle Avoidance," Proc. of the 2006 Am. Control Conf. 2166-2170, 2006.
Hohil, Myron et al. "Vehicle counting and classification algorithms for unattended ground sensors," Proc. of SPIE 5090, Unattended Ground Sensor Technologies and Applications V, 5090: 99-110, 2003.
Hwang, Soojung et al. "Collision Avoidance Maneuver Simulation of Tilt Rotor Unmanned Aerial Vehicle," 44th AIAA Aerospace Sciences Meeting and Exhibit, AIAA 2006-235, 2006.
Ikeda, Y. et al. "Automatic Air Collision Avoidance System," Air Force Research Laboratory, AFRL-VA-WP-TP-2002-317, 2002.
Janik, V.M. et al. "A Two-Dimensional Acoustic Localization System for Marine Mammals," Marine Mammal Science, 16(2): 437-447, 2000.
Kaushik, B. et al. "A Review of the Role of Acoustic Sensors in the Modern Battlefield," 11th AIAA/CEAS Aeroacoustics Conf., 26th AIAA Aeroacoustics Conf., May 2005, Monterey, California.
Kraft, Robert, "vol. 2: Development of a Ground-Based Acoustic Sensor System for the Detection of Subsonic Jet-Powered Aircraft," Aircraft IR/Acoustic Detection Evaluation, NASA Contractor Report 189705, 1992.
Kuchar, James et al. "A Safety Analysis Process for the Traffic Alert and Collision Avoidance System (TCAS) and See-and-Avoid Systems on Remotely Piloted Vehicles," AIAA 3rd Unmanned Unlimited Technical Conference, Workshop and Exhibit, AIAA, 2004.
Lacher, Andrew et al. "Unmanned Aircraft Collision Avoidance—Technology Assessment and Evaluation Methods," MITRE Corp., 2007.
Lemon, Stanley, "Towed-Array History," 1917-2003, IEEE J. Oceanic Eng'g, 29(2): 365-373, 2004.
Lo, Kam et al. "Broadband Passive Acoustic Technique for Target Motion Parameter Estimation," IEEE Transactions on Aerospace and Electronic Systems, 36(1), 163-175, 2000.
Lo, Kam et al. Tactical Unmanned Aerial Vehicle Localization Using Ground-Based Acoustic Sensors, Proceedings of the 2004 Intelligent Sensors, Sensor Networks and Information Processing Conference, ISSNIP 2004, 475-480, 2005.
Mann, David et al. "Chapter 9: Active and Passive Acoustics to Locate and Study Fish," Fish Bioacoustics, 279-309, 2008.
Matos, Anibal et al. "Development and Implementation of a Low-Cost LBL Navigation System for an AUV," OCEANS '99 MTS/IEEE, Riding the Crest into the 21st Century, 1999.
Mennitt, Dan et al. "Tracking Noise Sources Using Multiple Mobile Microphone Arrays," ICSV13—Vienna, 13th Int'l Cong. on Sound and Vibration, 2006.
Merlin, Peter, Ikhana Unmanned Aircraft System: Western States Fire Missions, NASA, Monographs in Aerospace History #44, NASA, 2009.
Metcalf, Marvin, "Acoustics on the 21st Century Battlefield," Joint Force Quarterly, Winter 1995-1996.

(56) References Cited

OTHER PUBLICATIONS

Michel, U. et al. "Investigation of airframe and jet noise in high-speed flight with a microphone array," 3rd AIAA/CEAS Aeroacoustics Conf., 1997.

Penney, R. "Collision avoidance within flight dynamics constraints for UAV applications," Aeronautical J., 193-199, 2005.

Pham, Tien et al. "Acoustic Data Collection of Tactical Unmanned Air Vehicles (TUAVs)," Army Research Laboratory, ARL-TR-2749, 2002.

Pham, Tien et al. "Acoustic Detection and Tracking of Small, Low-Flying Threat Aircraft," US Army Research Laboratory, 2002.

Pham, Tien et al. "Acoustic Signal Processing Toolbox for Array Processing," Proc. of SPIE 5096, Signal Processing, Sensor Fusion, and Target Recognition XII, 5096:597-606, 2003.

Pham, Tien et al. "Acoustic tracking of ground vehicles using ESPRIT," Proc. of SPIE 2485, Automatic Object Recognition V, 2485:268-274, 1995.

Pham, Tien et al. "Adaptive Wideband Aeroacoustic Array Processing," Proceedings of 8th Workshop on Statistical Signal and Array Processing, 295-298, 1996.

Pham, Tien et al. "TTCP AG-6: Acoustic Detection and Tracking of UAVs," Proc. of SPIE 5417, Unattended/Unmanned Ground, Ocean, and Air Sensor Technologies and Applications VI, 5417:24-30, 2004.

Phillips, Richard et al. "Determination of West Indian manatee vocalization levels and rate," J. Acoust. Soc. Am., 115(1) 422-428, 2004.

Piet, J. et al. "Localization of the Acoustic Sources of the A340 with a Large Phased Microphone Array During Flight Tests," Am. Instr. of Aeronautics and Astronautics Paper 2002-2506, 2002.

Rascon, Caleb et al. Localization of sound sources in robots: A review, Robotics and Autonomous Sys., 96, 184-210, 2017.

Reeder, C. et al. "Two-Hydrophone Heading and Range Sensor Applied to Formation-Flying for AUVs," IEEE, 517-523, 2004.

Reiff, C. et al. "Acoustic Detection and Localization from a Tethered Aerostat during the NATO TG-53 Test," Proc. of SPIE, Int'l Soc. For Optical Eng'g, 2006.

Robertson, Dale et al. "Acoustic Sensing from small-size UAVs," Proc. of SPIE 6562, Unattended Ground, Sea, and Air Sensor Technologies and Applications IX, 6656208-1-656208-8, 2007.

Robertson, Dale et al. "NATO TG-53: Acoustic Detection of Weapon Firing Joint Field Experiment," Proc. of SPIE 6231, Unattended Ground, Sea, and Air Sensor Technologies and Applications VIII, 2006.

Scanlon, Michael et al. "Acoustic Transient Source Localization from an Aerostat," ASC, 2006.

Scanlon, Michael et al. "Aerostat Acoustic Payload for Transient and Helicopter Detection," Proc. of SPIE 6538, Sensors, and Command, Control, Communications, and Intelligence (C3I) Technologies for Homeland Security and Homeland Defense, 2007.

Scanlon, Michael et al. "Networked Acoustic Sensor Array's Performance During 2004 Horizontal Fusion—Warrior's Edge Demonstration," 2004.

Shakernia, Omid et al. "Passive Ranging for UAV Sense and Avoid Applications," Infotech@Aerospace, AIAA 2005-7179, 2005.

Sijtsman, Pieter et al. "Determination of Absolute Contributions of Aircraft Noise Components using Fly-Over Array Measurements," 10th AIAA/CEAS Aeroacoustics Conference, AIAA 2004-2958, 2004.

Sour, Nassy, Back Propagation of Acoustic Signature for Robust Target Identification, Proc. of SPIE 4232, Enabling Technologies for Law Enforcement and Security, 4232: 399-408, 2001.

Srour, Nassy et al. "Remote Netted Acoustic Detection System: Final Report," Army Research Laboratory, ARL-TR-706, 1995.

Sundqvist, Bengt-Göran, Auto-ACAS—Robust Nuisance-Free Collision Avoidance, Proc. of the 44th IEEE Conf. on Decision and Control Conference, 2005, pp. 3961-3963.

Swihart, Donald et al. "Integration Techniques for Preventing Collisions Between Air Vehicles," Air Force Research Laboratory, 2002.

Valin, Jean-Marc et al. "Robust Sound Source Localization Using a Microphone Array on a Mobile Robot," Proc. of the 2003 IEEE/RSJ, Int'l Conf. on Intelligent Robots and Sys., 1228-1233, 2003.

Washburn, Karl et al. Correlating Noise Sources Identified by Beamforming with Sound Power Measurements, 2005-01-2510, SAE Int'l, 2005.

Wellman, Mark et al. "Enhanced Target Identification Using Higher Order Shape Statistics," Army Research Laboratory, ARL-TR-1723, 1999.

Williams, Chad et al. "Method for triangulation on a moving broadband airborne target," Proc. of SPIE 4393, Unattended Ground Sensor Technologies and Applications III, 4393, 30-39, 2001.

Williams, Ross et al. "Passive Acoustic Synthetic Aperture Processing Techniques," IEEE J. Oceaning Eng'g, 17(1): 8-15, 1992.

Yamamoto, Shun'ichi et al. "Real-Time Robot Audition System That Recognizes Simultaneous Speech in the Real World," Proc. of the 2006 IEEE/RSJ, Int'l Conf. on Intelligent Robots and Sys., 5333-5338, 2006.

Young, Stuart et al. "Acoustic Sensors on Small Robots for the Urban Environment," Proc. of SPIE 5804, Unmanned Ground Vehicle Technology VII, 5804: 97-108, 2005.

Young, Stuart et al. "Detection and Localization with an Acoustic Array on a Small Robotic Platform in Urban Environments," Army Research Laboratory, ARL-TR-2575, 2003.

English translation of office action dated Jul. 18, 2023 in connection with Japanese patent application No. 2022-565732, 7 pages.

Cline, et al. "The LOW-cost Scout uav Acoustic System (LOSAS)" Scientific Applications & Research Associates, 21 pages.

Defendant Zipline International Inc.'s Third Amended Invalidity Contentions, Mar. 15, 2024, 155 pages.

Milkie et al. "UAV Acoustic Sensor Concepts of Operation," Scientific Applications & Research Assoc, Inc (SARA), 19 pages.

Muller, et al. "Low Cost Scout UAV Acoustic System (LOSAS): Technology Overview and Demonstration Status," SARA, 14 pages.

Wes, et al. "The LOw-cost Scout uav Acoustic System (LOSAS)," Scientific Applications & Research Associates, 23 pages.

Subpoena to Testify at a Deposition in a Civil Action, dated Mar. 14, 2024, Civil Action No. 3:22-cv-04480-JSC, 6 pages.

Plaintiff SARA, Inc.'s Notice of Third Party Deposition Subpoena to Dorsey Whitney LLP, Mar. 14, 2024, 9 pages.

Supplemental Complaint dated Feb. 9, 2024 in connection with Civil Action No. 3:22-cv-04480-JSC, 178 pages.

Exhibit B in Civil Action No. 3:22-cv-04480-JSC, U.S. Pat. No. 7,606,115, 8 pages.

Demand for Jury Trial dated Feb. 23, 2024 in connection with Civil Action No. 3:22-cv-04480-JSC, 120 pages.

Exhibit 0005 in connection with Civil Action No. 3:22-CV-04480-JSC, Mpep 2001.06, Sources of Information under 37 CFR 1.56, 3 pages.

Exhibit 0006 in Civil Action No. 3:22-CV-04480-JSC, U.S. Appl. No. 63/082,838, 4th provisional application, 46 pages.

Exhibit 0007 in Civil Action No. 3:22-CV-04480-JSC, U.S. Appl. No. 63/082,832, 5th provisional application, 33 pages.

Exhibit 8 in Civil Action No. 3:22-CV-04480-JSC, Zipline Meetings 2020-2022, 9 pages.

Exhibit 1 in Civil Action No. 3:22-CV-04480-JSC, U.S. Patent Publication No. 20210225182A1, 23 pages.

Exhibit 2 in Civil Action No. 3:22-CV-04480-JSC, US Patent Publication No. US20220011786A1, 20 pages.

Exhibit 3 in Civil Action No. 3:22-CV-04480-JSC, US Patent Publication No. US20220053254A1, 21 pages.

Exhibit 4 in Civil Action No. 3:22-CV-04480-JSC, US Patent Publication No. US20230396909A1, 22 pages.

Exhibit 13 in Civil Action No. 3:22-CV-04480-JSC, Cline I, UAV Acoustic Sensor Technology Demonstrations and Capability Expansion, 20 pages.

Exhibit 14 in Civil Action No. 3:22-CV-04480-JSC, Cline II, Unmanned Systems North America Conference 2006, 27 pages.

Exhibit 15 in Civil Action No. 3:22-CV-04480-JSC, May 29, 2024 Court Transcript, 51 pages.

Exhibit 16 in Civil Action No. 3:22-CV-04480-JSC, Response to 101 Rejection in U.S. Patent Publication US20220011786A1, 2nd Non-Provisional Application, 5 pages.

(56)           References Cited

OTHER PUBLICATIONS

Transcript of Proceedings dated May 29, 2024 in connection with *Scientific Applications & Research Associates (SARA), Inc.* vs. *Zipline International,* Inc. 50 pages.

Allen et al., "AIAA 93-4343 Aeroacoustic Probe Design for Microphone to Reduce Flow-Induced Self-Noise," NASA Ames Research Center, Oct. 25, 1993, 11 pages.

Neiset, "Theoretical and Experimental Investigations of Microphone Probes for Sound Measurements in Turbulent Flow," Journal of Sound and Vibration, Jun. 7, 1974, 39 (3), 371-400.

Brown et al. "Acoustic Methods Used in the NASA Glenn 9-by 15-Foot Low-Speed Wind Tunnel," NASA Glenn Research Center, Jun. 2018, 50 pages.

Fields, "An Experimental Investigation of Flow-Induced Oscillations of the Brüel & Kjær In-Flow Microphone," Thesis, California Polytechnic State University, Jan. 1996, 69 pages.

Dassen et al. "Design and testing of a low self-noise aerodynamic microphone forebody," American Institute of Aeronautics and Astronautics, Inc. May 1996, AIAA Paper 96-1711.

* cited by examiner

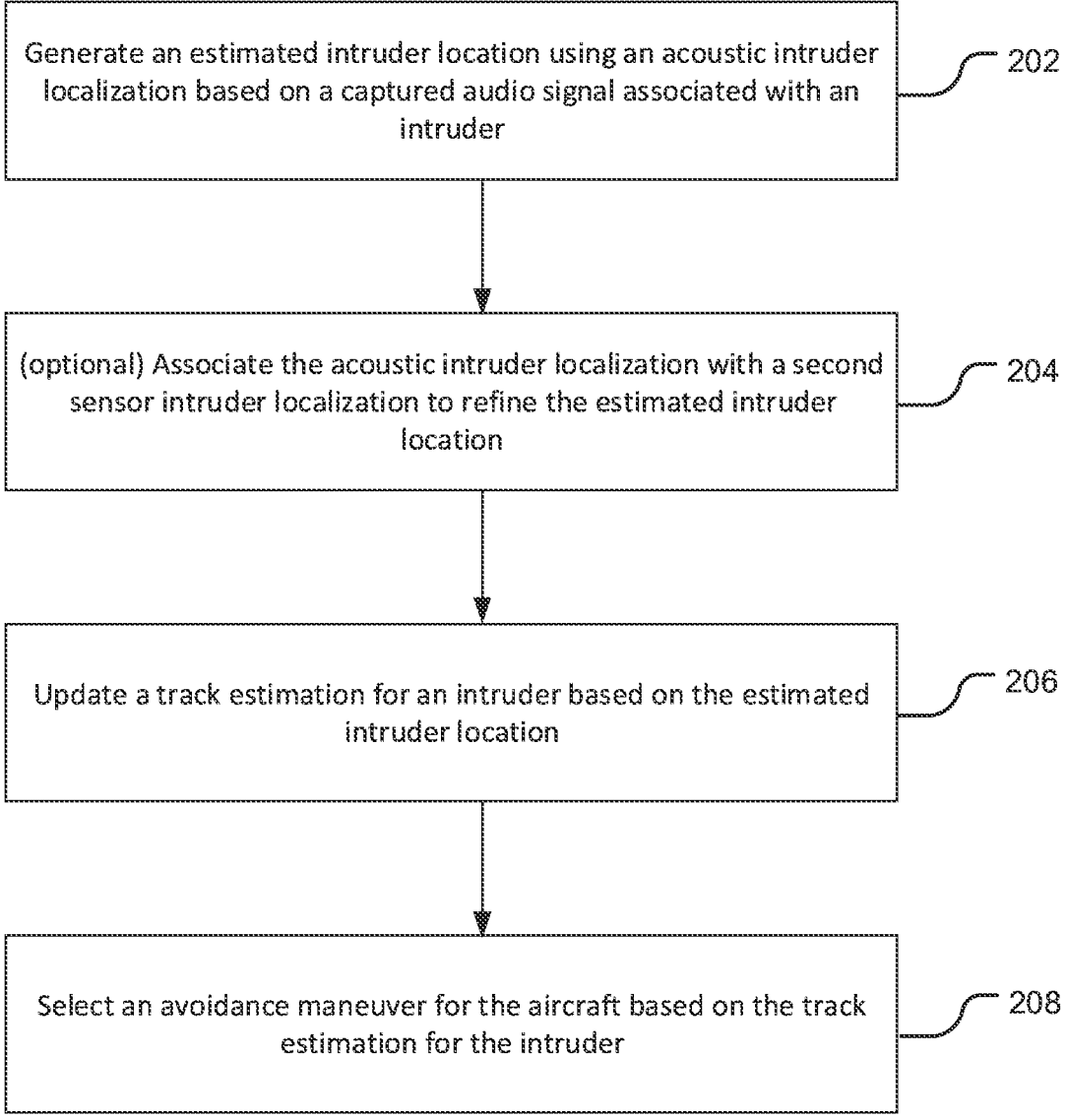

Generate an estimated intruder location using an acoustic intruder localization based on a captured audio signal associated with an intruder ⟋ 202

(optional) Associate the acoustic intruder localization with a second sensor intruder localization to refine the estimated intruder location ⟋ 204

Update a track estimation for an intruder based on the estimated intruder location ⟋ 206

Select an avoidance maneuver for the aircraft based on the track estimation for the intruder ⟋ 208

FIG. 4

Collect data regarding intruders ⟋ 302

Collect outcome data including outcome of avoidance maneuvers by the aircraft ⟋ 304

Generate a model to recommend avoidance maneuvers based on audio signals from intruders using the collected audio signal and outcome data ⟋ 306

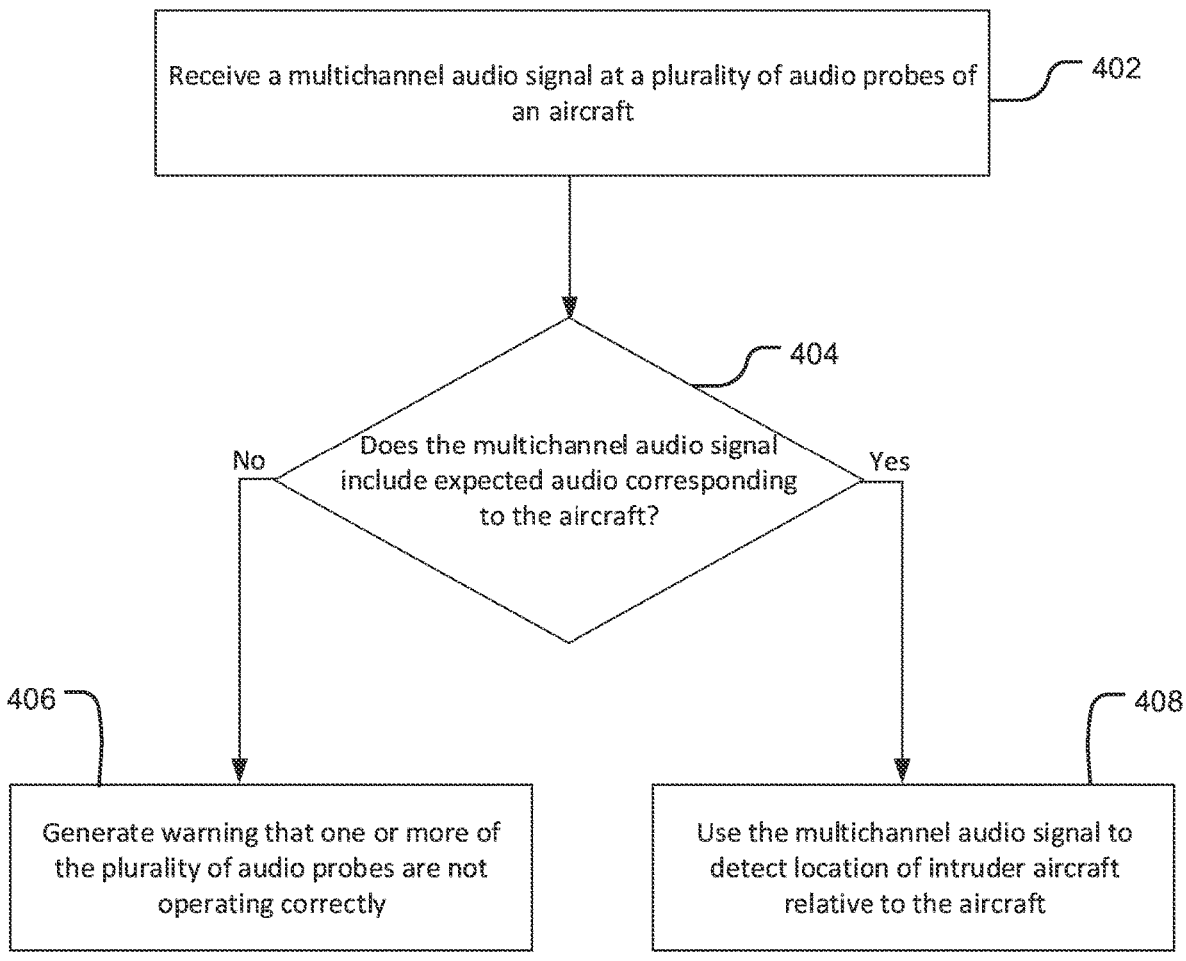

Receive a multichannel audio signal at a plurality of audio probes of an aircraft — 402

Does the multichannel audio signal include expected audio corresponding to the aircraft? — 404

No

Yes

406 — Generate warning that one or more of the plurality of audio probes are not operating correctly 408 — Use the multichannel audio signal to detect location of intruder aircraft relative to the aircraft

FIG. 6

CORRELATED MOTION AND DETECTION FOR AIRCRAFT

CROSS-REFERENCE TO RELATED APPLICATIONS

This application claims priority to and the benefit of U.S. Provisional Patent Application No. 63/082,821 filed Sep. 24, 2020 entitled "CORRELATED MOTION AND DETECTION FOR AIRCRAFT", U.S. Provisional Patent Application No. 62/955,946 filed Dec. 31, 2019 entitled "UNMANNED AIRCRAFT SYSTEM WITH MICROPHONE ARRAY", U.S. Provisional Patent Application No. 62/984,266 filed Mar. 2, 2020 entitled "UNMANNED AIRCRAFT SYSTEM WITH MICROPHONE ARRAY", and U.S. Provisional Patent Application No. 63/021,633 filed May 7, 2020 entitled "UNMANNED AIRCRAFT SYSTEM WITH MICROPHONE ARRAY", the entire disclosures of which are incorporated herein in their entirety by reference.

BACKGROUND

Conventional aircraft, including commercial aircraft and general aviation aircraft, follow established airspace rules to avoid collision with other aircraft. For example, in general, each aircraft is responsible for the airspace in front of the aircraft. In some airspaces, unmanned aerial vehicles (UAVs) may be required to maintain spherical coverage, meaning that the UAV must monitor airspace in each direction for intruding aircraft, e.g., detect and optionally maintain a spherical detection zone that is 360 degrees relative to the UAV. Additionally, UAVs may be responsible for moving out of the way of intruding aircraft, so that other aircraft do not encounter UAVs during flight. For example, select regulations may require that UAVs maintain a minimum distance between themselves and conventional aircraft. Conventional aircraft detection systems, such as radar, may be optimized for monitoring the area in front of an aircraft. While such systems may be altered to provide spherical coverage, a system providing such coverage may be prohibitively heavy and expensive to incorporate into a UAV. Also, such modifications may be technically complex and time consuming to achieve. Further, conventional detection systems may have difficulty with long-range detection, giving a UAV less time to detect other aircraft and alter its flight path to avoid other aircraft to maintain a required separation between the UAV and the other aircraft.

SUMMARY

A first signal is received at an acoustic detection system of an aircraft, where the first signal is a multichannel audio signal. The multichannel audio signal is determined to be associated with at least one intruding aircraft and a maneuver is commanded for the aircraft based on the multichannel audio signal and a second signal providing additional information about the intruding aircraft.

One or more non-transitory computer readable media are encoded with instructions which, when executed by one or more processors of an acoustic aircraft avoidance system, cause the acoustic aircraft avoidance system to analyze a first signal received at the aircraft to determine that the signal is associated with an intruder, where the first signal is a multichannel audio signal. Acoustic directional information corresponding to the intruder is generated using the microchannel audio signal. A track of the intruder is generated using the acoustic directional information and a second signal comprising additional information corresponding to the intruder. An avoidance maneuver is selected based on the track of the intruder.

A first location estimation for an intruder is generated based on a first signal received at an aircraft, where the first signal is a multichannel audio signal. A second location estimation is generated for the intruder based on a second signal comprising additional information regarding the intruder. A track corresponding to the intruder is updated using the first location estimation and the second location estimation. An avoidance maneuver is executed by the aircraft, where the avoidance maneuver is selected based on the track corresponding to the intruder.

A placement of a plurality of audio probes on an aircraft may be based on known aircraft audio characteristics. Intruder aircraft location is tracked relative to the aircraft using the placement of the plurality of audio probes. Multichannel audio signals received by the plurality of audio probes are monitored using the known aircraft audio characteristics to determine functionality of the plurality of audio probes.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 4 is a flow diagram of example operations for selecting an avoidance maneuver for an aircraft based on a track estimation of an intruder.

FIG. 6 is a flow diagram of example operations for monitoring functionality of audio probes of an aircraft based on a multichannel audio signal captured by the audio probes.

DETAILED DESCRIPTION

Figures 1A, 1B:
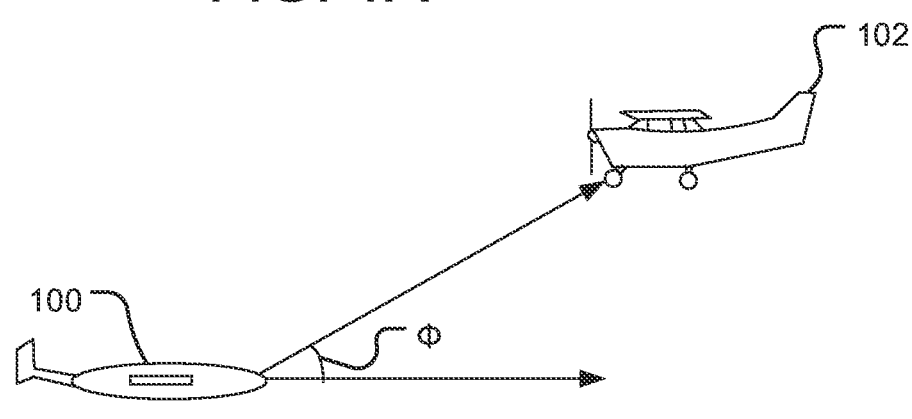
FIG. 1A illustrates a perspective view of an example aircraft and an intruder.
FIG. 1B illustrates a side elevation view of the example aircraft and an intruder.

Audio based aircraft detection and avoidance systems may provide an alternative to conventional detection systems for UAVs. An audio or acoustic based system may more readily provide spherical coverage without additional sensors facing in specific directions by utilizing omnidirectional microphones. An audio or acoustic based system may also provide spherical coverage through multiple non-omnidirectional microphones. For example, non-omnidirectional microphones may be used in combination with omnidirectional microphones to gather additional information (e.g., to resolve front/back ambiguity). The audio based system can distinguish between noise produced by intruding aircraft and other sources, e.g., noise produced by the aircraft's own engines (or other on-board systems, e.g., flight system), natural sources (e.g., wind or weather noise), determine directionality of sound (e.g., provide a location estimation of the intruder relative to the aircraft), determine spatial and identification information of a sound source (e.g., determine that the source of the sound likely belongs to a specific class of aircraft). An avoidance determination system that uses audio signal can also distinguish between multiple intruders and maintain a sufficiently high signal to noise ratio (SNR) to continually receive useful audio data, even as the aircraft executes avoidance maneuvers or updates its flight path.

In one embodiment, a detection and avoidance (DAA) system uses an array of audio sensors to determine location of intruding aircraft in multiple directions relative to an aircraft, e.g., such as within a spherical zone of 360 degrees. Audio signals generated by intruding aircraft may be differentiated from, for example, wind noise or noise from the aircraft by comparing received audio signals to known aircraft signals or models of aircraft signals and rejecting broadband signals (e.g., wind), non-directional signals, and near-field signals (e.g., noises from the aircraft's own engine). When an intruder signal is detected (i.e., presence of an intruder is detected), the DAA system determines location information for the intruder. For example, using the distance between the audio sensors, the DAA system may calculate the azimuth of the intruder relative to the aircraft to estimate a location of the intruder. In some implementations, the DAA system may analyze changes in the intruder signal as the aircraft moves relative to the intruder to determine the range and elevation of the intruder relative to the aircraft. It should be noted that although examples herein may discuss a single intruder, in some instances, there may be multiple intruders or sound sources. In these instances, the system may be configured to detect and estimate the location of two or more intruders and avoid each intruder as needed.

The DAA system may use the location information generated from acoustic signals and additional location or velocity information (e.g., location determined using automatic dependent surveillance-broadcast (ADS-B), light detection and ranging (LiDAR), radio detection and ranging (radar), global positioning satellite (GPS), image data, or other sensing modalities) to track intruders by generating a track corresponding to each intruder, which may show the movement of the intruder over time and may, in some implementations, include a prediction of the flight path of the intruder. The DAA system may evaluate tracks corresponding to one or more intruders and determine an avoidance maneuver or a change in a flight plan for the aircraft to move away from the intruders, keep an avoidance zone of the aircraft clear of intruders, and/or avoid collision with intruders.

The DAA system may also be selected to maintain a clear zone (e.g., a spherical zone with a radius of 2,000 feet) around the subject aircraft. For example, rather than attempting to "avoid" an intruder, the DAA system may attempt to maintain a free or unobstructed volume, such as a sphere or space. In these instances, the DAA system may generate flight path changes based on estimated intruder locations that are set to maintain the free airspace distance, rather than avoid a collision with the intruder and the UAV. To maintain a clear zone, the DAA system may detect an intruder and determine the general location of the intruder relative to the airspace and distancing. In the event of multiple intruders, intruders may be distinguished based on different locations relative to the subject aircraft, distances between audio signals generated by the intruders (e.g., different frequency bands), and other sound source separation techniques.

FIG. 1A is a top perspective view of a relationship between an aircraft 100 using acoustic based DAA and an intruder 102. FIG. 1B shows the general relationship between the aircraft 100 and the intruder 102 from an alternate angle. As shown in FIG. 1A, the spatial relationship between the aircraft 100 and the intruder 102 may be defined in terms of azimuth θ, elevation angle Φ, and range R. With reference to the aircraft 100 and the intruder 102, azimuth θ is the angle between the aircraft 100 and the intruder 102 from the perspective of the aircraft 100, where the angle θ is projected on a reference plane (shown in broken likes) parallel to the horizon. Elevation Φ is the angle between the angle between the aircraft 100 and the intruder 102 from the perspective of the aircraft 100, where the angle Φ is projected on a reference plane perpendicular to the horizon. Range R is the radial distance between the aircraft The DAA system may allow the aircraft 100 to detect other aircraft within a detection zone 101 (or other relevant detection area) such that the aircraft 100 can keep an avoidance zone 103 clear of intruders.

A DAA system may be used to track, e.g., follow the movement, an intruder 102 (or multiple intruders) while the intruder 102 is within the detection zone 101. The DAA system may also direct the aircraft 100 to perform maneuvers or update its flight path to keep the avoidance zone 103 clear of intruders. Changes to flight path and maneuvers may be determined based on an estimated location of the intruder or the track of the intruder 102 generated from multiple estimated locations of the intruder 102. Use of acoustic or audio based detection may use any methods or systems described in U.S. Patent Application No. 63/082,838, entitled "Acoustic Based Detection and Avoidance for Aircraft," which is hereby incorporated in its entirety.

The aircraft 100 may be provided with an audio array that includes multiple audio sensors, such as omnidirectional microphones, mounted on the aircraft 100. For example, the audio array may be implemented by the audio array described in U.S. Patent Application No. 63/082,869, which is hereby incorporated herein in its entirety for all purposes. When a signal is received at the audio array, the DAA system 105 may determine whether the signal is likely associated with an aircraft by analyzing variations of a signal across sensors in the array. For example, where a signal is the same across all sensors and does not vary over time, the signal is likely uncorrelated (not directional) or present in the near-field of the sensor array (near-field) and thus can be assumed to be not associated with an intruder. For example, noise from wind or motors of the aircraft 100 would be less likely to vary periodically and would likely result in a similar signal across various sensors. Where the signal is likely from an intruder, the DAA system may estimate the azimuth θ of the intruder 102 by analyzing variations in the audio signal across sensors and the distance between sensors.

To estimate additional location information, such as the elevation angle Φ and range R of the intruder 102, the DAA system may observe changes in the audio signal as the aircraft 100 moves or as the sensors move (e.g., via actuation of the sensors) relative to the intruder 102. In some implementations, specific maneuvers may be used to gather additional data, e.g., force changes in the signal characteristics by changing positioning of the aircraft 100 relative to the intruder 102. For example, the aircraft 100 may rotate along its roll axis while the DAA system analyzes the audio signal to generate an estimation of the elevation angle Φ and range R of the intruder 102.

The azimuth θ, elevation angle Φ, and/or range R estimated provide an acoustic state estimation of the intruder 102. The DAA system may combine the acoustic state estimation with one or more additional state estimations of the intruder 102 generated using other sensing modalities to generate a track of the intruder. For example, the aircraft 100 may be equipped with ADS-B, which may capture additional information used to generate the additional state estimation of the intruder 102. The DAA system may combine the acoustic state estimation with the additional state estimation to create or update a track of the intruder 102. In some implementations, an aircraft class of the intruder (e.g., whether the intruder is a helicopter, small passenger aircraft, or other type of aircraft) may be detected from the sound and used to refine the acoustic state estimation or track of the intruder. For example, assumptions about the movement of an aircraft may be made based on the likely class of the aircraft (e.g., general ranges of velocity, altitude, flight patterns, and the like). The track of the intruder 102 may be used by systems of the aircraft 100 to maneuver away from the intruder 102 or to otherwise update a flight path to maintain a desired separation between the aircraft 100 and the intruder 102.

Figure 2:
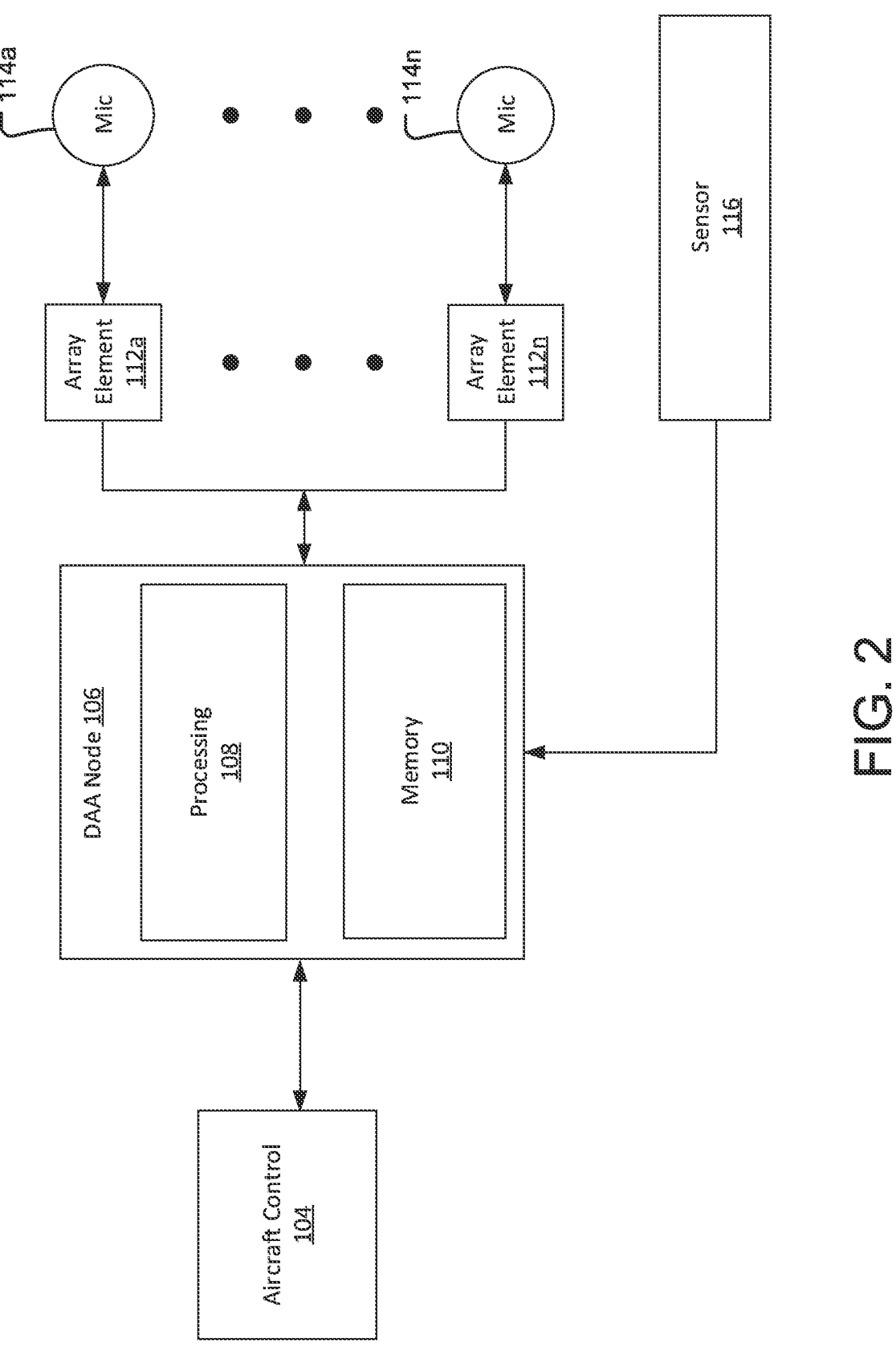
FIG. 2 is a schematic diagram of an example detection and avoidance (DAA) system in accordance with particular embodiments.

FIG. 2 shows an example hardware diagram used to implement an avoidance determination system using a DAA system. A DAA node 106 includes processing 108 and memory 110 that may analyze audio signals received at microphones 114*a-n* as well as signals received at a sensor 116. Array elements 112*a-n* may format or process signals received by microphones 114*a-n* before the signals are provided to the DAA node 106 for processing and analysis. The DAA node 106 may also communicate with aircraft control 104 such that the DAA node 106 can command the aircraft 100 to perform a variety of maneuvers, update its flight plan, perform other actions to keep an avoidance zone 103 of the aircraft 100 clear of intruders, and perform other actions to gather more information about the location of intruders relative to the aircraft 100.

Microphones 114*a-n* may be mounted on the aircraft 100 at locations selected to minimize flight-related or background noise perceived by the microphones 114*a-n* while maximizing noise from other aircraft. For example, in some implementations, the microphones 114*a-n* may be mounted on probes connected or attached to wings of the aircraft 100 to decrease flight-related noise from wind passing over the probes Additional microphones may be mounted elsewhere on the aircraft 100. In various implementations, the microphones 114*a-n* may be omnidirectional microphones or directional microphones or may be implemented by a combination of omnidirectional microphones, directional, and/or other microphones. The microphones 114*a-n* may be implemented to provide a digital signal or an analog signal. Collectively, the audio signals collected at the microphones 114*a-n* provide a multichannel audio signal to the avoidance determination system. Also, it should be noted that the microphones may be configured to be movable or otherwise variable in their geometry relative to the aircraft and such movement may be used to detect a signal at a different orientation relative to the aircraft, which may be used, instead of or supplement a maneuver by the aircraft.

Array elements 112*a-n* may be implemented by various hardware capable of capturing and processing signals from the microphones 114*a-n*. For example, in one implementation, the array elements 112*a-n* may be implemented using programmable logic to digitize analog audio signals collected at the microphones 114*a-n*. In other implementations, array elements 112*a-n* may be implemented using other types of hardware including microcontrollers, system on chip (SOC) hardware, and other types of compute resources.

The sensor 116 may be implemented using various sensing modalities or combinations of sensing modalities such as, for example, ADS-B in receiver, LiDAR, radar, GPS, and/or image sensing (e.g., various types of cameras), that may be located on the aircraft or separate therefrom.

Accordingly, the sensor 116 may include sensors corresponding to any of the above sensing modalities and may include sensors corresponding to more than one sensing modality. In some implementations, the sensor 116 may include some processing of data from the sensors. For example, processing at the sensor 116 may generate a state estimation for an intruder based on information collected by various sensors. In other implementations, the sensor 116 may provide raw data, which may be processed at another location. For example, the sensor may collect ADS-B data and pass raw data directly to the DAA node 106 for processing.

DAA node 106 includes processing 108 and memory 110. Memory 110 may be implemented using any combination of volatile and non-volatile memory. Processing 108 may include one or more processors operating individually or in combination and may include, for example, programmable logic and other processors, including graphical processing units. In various implementations, the DAA node 106 may be implemented by SOC hardware, a microcontroller, or various compute resources. The DAA node 106 may also be implemented by combinations of various types of compute resources. For example, in one implementation, the DAA node 106 includes a controller board and a microcontroller.

Aircraft control 104 may include various systems to control the aircraft 100 and to communicate with ground station and other aircraft. For example, aircraft control 104 may include transmitting and receiving hardware for communications via very high frequency (VHF) radio bands, satellite communications, cellular communications, or communications via additional radiofrequency bands. Aircraft control 104 may include various components and modules responsible for generating a flight plan for the aircraft 100, actuator control, propulsion control, payload management, and safety system management, among others. The aircraft control 104 may be implemented by any number of hardware components including SOC hardware, various processors, controllers, and programmable logic.

Various hardware components of the DAA system may be communicatively connected by communications buses, universal serial bus (USB) connections, or other communicative connections.

Figure 3:
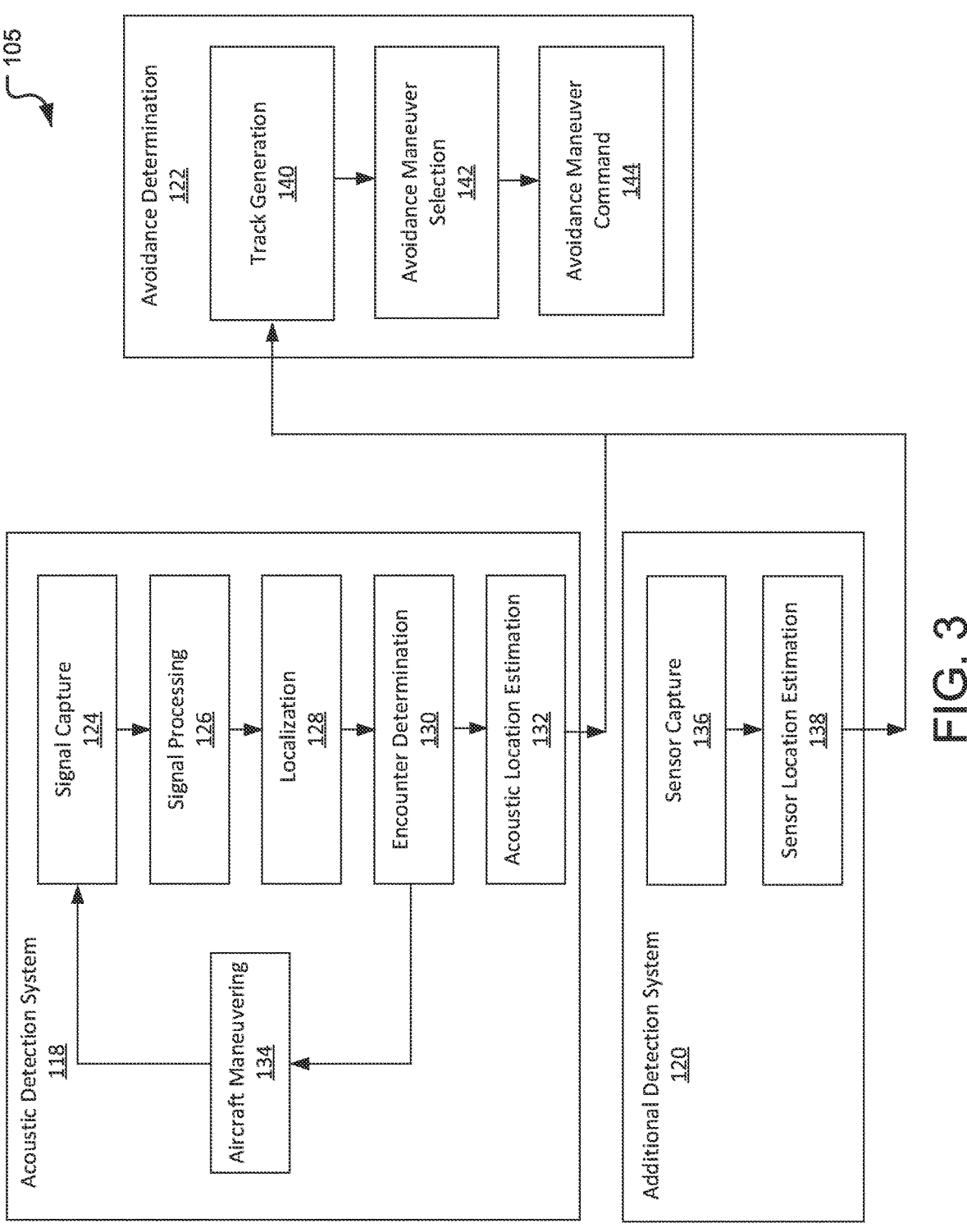
FIG. 3 is a block diagram of an example DAA system in accordance with particular embodiments.

FIG. 3 shows a block diagram of an example DAA system 105 generally including an acoustic detection system 118, an additional detection system 120, and avoidance determination 122. Each block of the example DAA system may be implemented using a variety of algorithms, models, programming, or combinations of various algorithms, models, and programming. In some implementations, instructions corresponding to each block of the DAA system may be executed using the same processor (e.g., DAA node 106). In other implementations, some instructions may be executed by processors on different boards or by different processors on a shared board. For example, instructions for signal capture 124 and signal processing 126 may be executed by processors at array elements 112*a*-112*n*, while localization 128 and encounter determination 130 may be executed using processing resources 108 at the DAA node 106. Encounter determination 130 may, for example generate a probability, likelihood, or confidence that an intruder exists within a sphere of detection relative to the aircraft. Further, instructions for one block of the DAA system may be executed at multiple locations. For example, initial signal processing 126 instructions may be executed at array elements 112*a*-112*n*, while further signal processing 126 may occur at the DAA node 106.

One or more blocks of the example DAA system may be implemented using machine learning models, including deep neural networks. In some implementations, several blocks of the DAA system may be implemented by a single model or using combinations of models that work cooperatively. For example, in one implementation, localization 128 and encounter determination 130 may be implemented by a shared deep neural network, while track generation 140 and avoidance maneuver selection 142 are implemented by a separate shared deep neural network.

The acoustic detection system 118 may include various hardware for collecting, processing, and analyzing acoustic signals. Instructions for signal capture 124 may include algorithms to timestamp received audio signals and align audio signals across channels to generate a multichannel audio signal. In some implementations, signal capture 124 may include converting analog signals to digital signals for processing. Signal capture 124 may occur at array elements 112*a*-*n*, the DAA node 106, or a combination of the array elements 112*a*-*n* and the DAA node 106. For example, in some implementations, incoming analog signals may be converted to digital signals and time stamped at respective array elements 112*a*-*n* and the digital signals may be aligned to form a multichannel audio signal at the DAA node 106.

Instructions for signal processing 126 may include algorithms and machine learning models for transforming a multichannel audio signal. The algorithms or models included in signal processing 126 may be dependent upon methods implemented by the DAA system to analyze the multichannel audio signal. For example, in one implementation, the DAA system includes a model for localization that receives three-dimensional frequency domain data as input and signal processing 126 includes a fast Fourier transform (FFT) algorithm to transform the multichannel audio signal to the frequency domain. Signal processing 126 may also include resampling the audio signal to a different sampling frequency. In another implementation, signal processing 126 may occur within a deep neural network implemented by the DAA system. In some implementations, signal processing 126 may include filtering out extraneous noise from the multichannel audio signal. For example, signal processing 126 may identify broadband wind signals and filter those signals from the multichannel audio signal.

Instructions for localization 128 may be implemented using various combinations of algorithms and machine learning models depending on the localization method implemented by the DAA system. For example, localization 128 may include algorithms for beamforming of a multichannel audio signal and additional algorithms for analyzing the beamformed audio signal to determine directionality. In another example implementation, localization 128 may be implemented using multiple binary classifiers representing bins of azimuth angles to generate an estimation of azimuth. In yet another example implementation, localization 128 may be implemented using a deep neural network generated using labeled multichannel audio and directional data. Localization 128 may also include machine learning models, algorithms, or combinations to determine range and elevation based on audio signals gathered during motion of the aircraft 100.

Aircraft maneuvering 134 may be implemented to provide instructions for specific aircraft maneuvers to the aircraft control 104. Accordingly, aircraft maneuvering may include instructions to various components of the aircraft control 104 (e.g., instructions for actuation control and propulsion control) to initiate various aircraft maneuvers which may, in some implementations, be used to gather additional information about the intruder 102. In some implementations, the instructions provided to the aircraft control 104 by aircraft maneuvering 134 may be dependent on estimations generated by localization 128.

Encounter determination 130 may be a module making an initial determination of whether a received audio signal is associated with one or more likely intruders. For example, an encounter may be determined when a sound source indicates the presence of one or more intruders within a spatial area surrounding the UAV, within a distance relative to the UAV, or other threshold selected by the system. In the method, the encounter determination 126 may be implemented by various combinations of algorithms and machine learning models to generate a likelihood that a received multichannel audio signal is associated with an intruder 102. In some implementations, encounter determination 130 may be implemented using a deep neural network generated using multichannel audio signals from known aircraft (e.g., using audio recordings of aircraft generated noise). The deep neural network may be the same deep neural network used for localization 128, in some implementations.

In another example implementation, encounter determination 130 is implemented using a classifier (either separate from or in combination with the deep neural network), which may be, for example, a random forest classifier or a binary classifier. In yet another implementation, encounter determination 130 may be implemented using algorithms and models to compare a received multichannel audio signal to known audio signals associated with aircraft. For example, the blade pass frequencies of aircraft may be utilized to generate multiple filters showing frequencies associated with aircraft. For example, the a priori knowledge of blade pass frequencies of potential intruder aircraft may be utilized to generate multiple filters based on fundamental and harmonic frequencies that are expected from such intruder aircraft. The multichannel audio signal (or a representation of the multichannel audio signal generated by signal processing 126) may be cross correlated or otherwise compared to the filters to determine whether the signal is associated with an aircraft. In some implementations, encounter determination 130 may also include models and algorithms to identify a specific type of aircraft during the cross-correlation process. Identification of a specific type of aircraft may include identification or a particular make and model of aircraft or identification of a class of aircraft (e.g., helicopters, jets, or small aircraft using propellers). Identifying a specific type of aircraft may also be done elsewhere within the model, and may, in some implementations, be done separately by a deep learning model. In some examples, the encounter determination 130 may include a probability that the signal is associated with a general aviation aircraft, a helicopter, or the like. As another example, the audio signal may be characterized as being associated with a more specific range of aircraft, e.g., heavy jet, light jet, narrow body aircraft, or the like. The classification may assist the system in making decisions regarding maneuvers to either avoid the intruder and/or maintain a free airspace, since information, such as the expected flight elevation, velocity ranges, and the like may be extracted and utilized by the system based on the classification of the type of aircraft.

The additional detection system 120 may include hardware for sensors in one or more additional sensing modalities, including, in some examples, an additional acoustic detection array. Sensor capture 136 may be implemented by sensors capable of detecting an intruder within a detection zone 101 of the aircraft 100. In some implementations, sensor capture 136 may have a different detection range than the acoustic detection system 118, such that sensor capture 136 may capture signals outside of the detection zone 101. Sensor capture 136 may include, for example, sensors to implement ADS-B, LiDAR, radar, GPS, and/or image sensing. In some implementations where multiple types of sensors are included in sensor capture 136, sensors may be redundant (e.g., two types of sensors capture data about the same physical space) or may cover different spatial areas. For example, sensor capture 136 may include radar to sense the space in front of the aircraft 100 and stereoscopic cameras sensing space to the sides and behind the aircraft 100.

Sensor location estimation 138 may be implemented using processors at the sensor 116 or the DAA node 106. In some implementations, sensor location estimation 138 may be implemented by processors both at the sensor 116 and the DAA Node 106. For example, processing at the sensor 116 may process the initial raw signal (e.g., time stamping the signal), while the DAA Node 106 uses the initial raw signal to generate a location estimation. In some implementations, multiple types of sensors may be implemented in sensor capture 136 and sensor location estimation may include algorithms, models, or various combinations to generate a location estimation based on the multiple signals. In other implementations, sensor location estimation 138 may be implemented using known algorithms or methods to generate location estimation based on the collected signals.

In various implementations, sensor location estimation 138 may estimate location using a first signal (e.g., an audio signal) and a second signal. The second signal may be another audio signal collected at a different point in time or a signal collected using a different sensor modality, such as ADS-B In, LiDAR, radar, image data or vision-based signal, GPS, or other sensor modalities. For example, in one implementation, an audio signal may be used in conjunction with a vision-based signal (e.g., a camera) to generate a location estimation. In this example, the audio signal may provide a rough approximation of location (e.g., there is likely an intruder on the left side of the aircraft), while a vision-based signal may refine an estimation generated from the audio signal. In other words, the first signal may be used to determine general location information that may be detected from a farther distance and the second signal may be used to determine more accurate or sensitive location information, that may be detected from a closer distance to the source. In these instances, the first signal may be used to determine when to actuate sensors for the second signal, e.g., once the first signal has been used to detect an intruder within a particular distance threshold of the aircraft, the system can then actuate the second sensor and detect the second signal.

The second signal may also be used to supplement the first signal. For example, an audio signal may also provide no directional information, instead providing an indication that there is an intruder somewhere relative to the aircraft, but without directional information. In this example, one or more cameras may be activated responsive to the audio detection of an intruder to search for the source of the audio signal and generate a location estimation of the intruder. Further, in some implementations, three or more different signals (differing in collection time, sensing modality, or both collection time and sensing modality) may be used to generate a location estimation 138.

Avoidance determination 122 may be implemented using various models, algorithms, programming, or various combinations of models, algorithms, and programming. Instructions for avoidance determination 122 may be executed using processing 108 and the DAA node 106. In some implementations, for example, a deep neural network may implement both track generation 140 and avoidance maneuver selection 142. In other implementations, an algorithm may be used to implement track generation 140 and a machine learning model may be used to implement avoidance maneuver selection 142. For example, avoidance maneuver selection 142 may be implemented using a deep neural network generated using flight simulation data, real world flight data, or a combination of flight simulation data and real-world flight data. Avoidance maneuver selection 142 may also be implemented by other models, such as a random forest model trained using flight simulation data, real world flight data, or a combination of flight simulation data and real-world flight data.

Other types of models for avoidance maneuver selection 142 may include heuristic based models, reinforcement learning, model predictive control, dynamic programming, and combinations thereof. For example, a reinforcement learning model may observe changes in the audio signal due to various maneuvers (either in flight or by simulations), where such changes may then be used to select maneuvers to obtain a desired outcome (e.g., moving farther from an intruder).

In some implementations, maneuvers may be selected using information theory to select maneuvers that may collect the most data about intruding aircraft. For example, a system may score various possible maneuvers, including avoidance maneuvers, information gathering maneuvers, and maneuvers that serve as both avoidance and information gathering maneuvers based on the amount of information that is likely to be gathered by the maneuvers. In some implementations, the highest scoring maneuver that also avoids the intruder or keeps a zone around the aircraft clear may then be chosen such that the aircraft may gather additional information about the intruder during the maneuver.

Instructions for avoidance maneuver command 144 may be executed using processing 108 of the DAA node 106 to communicate with aircraft control 104. Avoidance maneuvers may include, in various implementations, changes in flight path of the aircraft 100, finite maneuvers after which the aircraft 100 returns to an original flight plan, or other movements that generally keep the avoidance zone 103 of the aircraft 100 clear of intruders or avoid collisions, weather, etc. The various blocks of the acoustic based DAA system may be, in some implementations, implemented by common models. Generally, the various blocks are communicatively connected and cooperatively process and analyze multichannel audio data and additional sensor data.

FIG. 4 is a flow diagram of example steps for selecting an avoidance maneuver for an aircraft based on a track estimation of an intruder. A generating operation 202 generates an estimated intruder location using an acoustic intruder localization based on a captured audio signal associated with an intruder. The acoustic intruder localization may be generated by the acoustic detection system 118 using methods and systems described in U.S. Patent Application No. 63/082,838, entitled "Acoustic Based Detection and Avoidance for Aircraft," which is hereby incorporated in its entirety. The state intruder localization may include location information for the intruder, which may be expressed, in some implementations, as an estimated azimuth, elevation angle, and range.

An optional associating operation 204 associates the acoustic intruder localization with a second intruder location to generate an estimated intruder location. The second sensor intruder localization may, in some implementations be generated based on acoustic signals from an additional acoustic detection system. Alternatively or additionally, the second sensor intruder localization may be based on one or more of, for example, ADS-B In, LiDAR, radar, image data, GPS, or other position sensing modalities.

The acoustic intruder localization and the second sensor intruder localization may be associated using, for example, timestamps associated with each localization. For example, an acoustic intruder localization and a second sensor intruder localization may be associated when the timestamps associated with the localizations are within a similar time interval (e.g., the localizations were generated based on data collected within 1 second of each other). In some implementations, localizations may be further or alternatively associated based on the location of the intruder in the localization. Using intruder location may prevent, for example, false associations between an acoustic localization locating a first intruder and a second localization locating a second intruder at the same time.

Various methods may be used to generate an estimated intruder location and the methods may be updated based on accuracy of the sensors and systems used to collect data. For example, a second localization based on radar data may be weighted higher (e.g., is viewed as more likely to be correct) than the acoustic intruder localization, such that the estimated location may be expressed as a weighted average of the localizations. In some implementations, probabilistic filtering, such as Bayesian filters (such as Kalman filters) or Monte-Carlo methods (such as particle filters), may be used to generate an estimated intruder location. Where previous location estimations have been calculated for an intruder (e.g., the intruder is being actively tracked by the DAA system), the estimated intruder location may be compared to the previous location estimation or a prediction of the existing intruder location and may be adjusted based on the existing intruder location. For example, where the estimated location and the existing intruder location show an intruder moving a physically impossible or improbable distance over a time interval, the estimated location may be adjusted or, in some cases, disregarded, based on the existing intruder location. Such comparisons may, in some implementations, use an estimated class of the aircraft obtained from analysis of the audio signal to generate a predicted location estimation based on a previous or existing location estimation. For example, where an aircraft is determined, with a high likelihood of probability, to be a small propeller-powered aircraft, an estimated location may be adjusted or disregarded where the aircraft would have had to travel at higher than possible (or probable) speeds for that class of aircraft for the estimated location to be correct.

In some implementations, tracking or comparing location estimations may resolve a location from multiple possible locations generated because of the geometry of the array. For example, in a linear array, two possible detections for an intruder may be generated where one detection shows the intruder in the correct location and another is mirrored across the wing, front to back. By tracking how the detections move over time, the correct detection may be chosen based on probable or likely movement of the intruder. For example, where one track shows reasonable and likely movement and a second track shows an intruder traveling at higher than average speeds or in an unusual (or impossible) direction, the second track may be disregarded.

An updating operation 206 updates a track estimation for an intruder based on the estimated intruder location. A track estimation may include multiple estimated locations to map the movement of an intruder over time. In some implementations, a track estimation may also include a prediction of future motion of the intruder. Track estimations may also be based on flight data for intruders collected from other sources, such as filed flight plans, air traffic data, or ground based aircraft detection systems.

The updating operation 206 may compare the estimated intruder location to multiple existing tracks to determine which intruder track to update using the estimated intruder location. The comparison may be based on, for example, probable location, audio signal comparison, or predicted movement of the intruder. Where the estimated intruder location does not match an existing track estimation, the updating operation 204 may generate a new track estimation.

A selecting operation 208 selects a maneuver for the aircraft based on the track estimation for the intruder aircraft, where the maneuver can be selected to increase a distance between the intruder and the aircraft, e.g., an avoidance maneuver, and/or to detect additional information about the intruder, e.g., information maneuver. In some implementations, the avoidance maneuver may be based on multiple intruder tracks. The selecting operation 206 may use a model receiving at least the intruder track as input to generate a suggested avoidance maneuver. Various models, such as a random forest or deep neural network may be used in the selecting operation 206. Such models may be generated using simulated flight data, real-world flight data, test data, or combinations of different types of data. For example, a deep neural network used in the selecting operation 206 may be generated using flight simulation data for the aircraft and flight data regarding the effect of various maneuvers on the acoustic detection system 118. As a result, the deep neural network may suggest avoidance maneuvers that keep the avoidance zone 103 clear of intruders and generate minimal excess noise at the microphones 114a-n, such that the acoustic detection system 118 continues to function well during execution of maneuvers. For example, avoidance maneuvers may be suggested by the deep neural network that do not reduce the SNR of signals collected by the microphones 114a-n below a threshold value. A random forest classifier or other machine learning models may also be used in the selecting operation 206 and may be trained using flight simulation data, real-world flight data, test data, or combinations of different types of data.

Avoidance maneuvers may be generated based on the current flight plan of the aircraft 100 and tracks of intruders (including predicted tracks) to keep the avoidance zone 103 of the aircraft 100 clear of intruders. For example, where the current flight plan for the aircraft 100 and the predicted track of the intruder 102 show that the intruder 102 would enter the avoidance zone 103 above the aircraft 100, the generating operation 206 may generate an avoidance maneuver reducing the elevation of the aircraft 100 to keep the avoidance zone clear. Similarly, the aircraft 100 may, for example, increase elevation, change heading, hover, or enter a holding pattern to keep the avoidance zone 103 clear of intruders.

Maneuvers may also be selected to maintain the SNR of signals collected by the microphones 114*a-n* and/or to vary the collected signals in order to better understand the position of the intruder. For example, a quick change in elevation may produce a cross-wind, generating excess noise and reducing the SNR of any audio signals collected by the microphones 114*a-n*. In the selection operation 206, a rate of descent may be chosen such that the SNR remains above a threshold value during the avoidance maneuver. For example, the angle of descent or ascent may be chosen to complement aerodynamic characteristics of probes mounting the microphones 114*a-n* to the aircraft 100. In another example, changes to the orientation of the aircraft 100 during maneuvers may mitigate reduced SNR caused by the maneuvers. For example, an adjustment to the roll angle of the aircraft 100 may counteract wind noise created by an elevation change. In some implementations, the DAA system 105 may continually monitor the SNR of signals received at the microphones 114*a-n* and such mitigating adjustments may be made during flight of the aircraft 100.

As yet another example, the maneuvers may be instituted in order to purposefully vary the relationship of the array microphones relative to the intruder. In this manner, the maneuvers may be used to generate additional information, such as variations in the acoustic signals, that help to provide further information for the intruder, as well as assist in separating noise from the intruder signals. In various implementations, there may be predetermined maneuvers that can be used to gain information based on an estimated location of the intruder. For example, a roll in a select direction or wing wag in a particular manner may be used when the detected intruder signal is coming from a particular location relevant to the aircraft. These maneuvers may be predetermined based on the techniques described herein and are directly related to the desired variation in the signal that can help increase the accuracy in the detected signal. It should be noted that in many embodiments, a selected maneuver may both be an avoidance maneuver and increase a distance relative to the intruder and may provide additional information regarding an estimated position of the intruder.

Models used in the selecting operation 206 may use additional data, such as, for example weather data, flight conditions, fuel levels, airspace restrictions applicable to a specific geographic area, terrain maps, etc. in selecting an avoidance maneuver. For example, weather close to the aircraft 100 may preclude an avoidance maneuver that would otherwise be a good choice in keeping the avoidance zone 103 clear of intruders. As another example, a maneuver that would be the best at increasing a distance relative to the intruder may not be selected if such a maneuver may be at risk for generating a terrain collision (e.g., with ground) for the aircraft.

After the selection operation 206, the DAA system may optionally communicate with aircraft control 104 to effectuate the selected avoidance maneuver. The DAA system may continue to collect data to generate estimated intruder locations and use the estimated intruder locations to update tracks during execution of avoidance maneuvers. In some implementations, the DAA system may store avoidance maneuvers and intruder track data and use the stored data to update or further train models used in the selecting operation 206.

Figure 5:
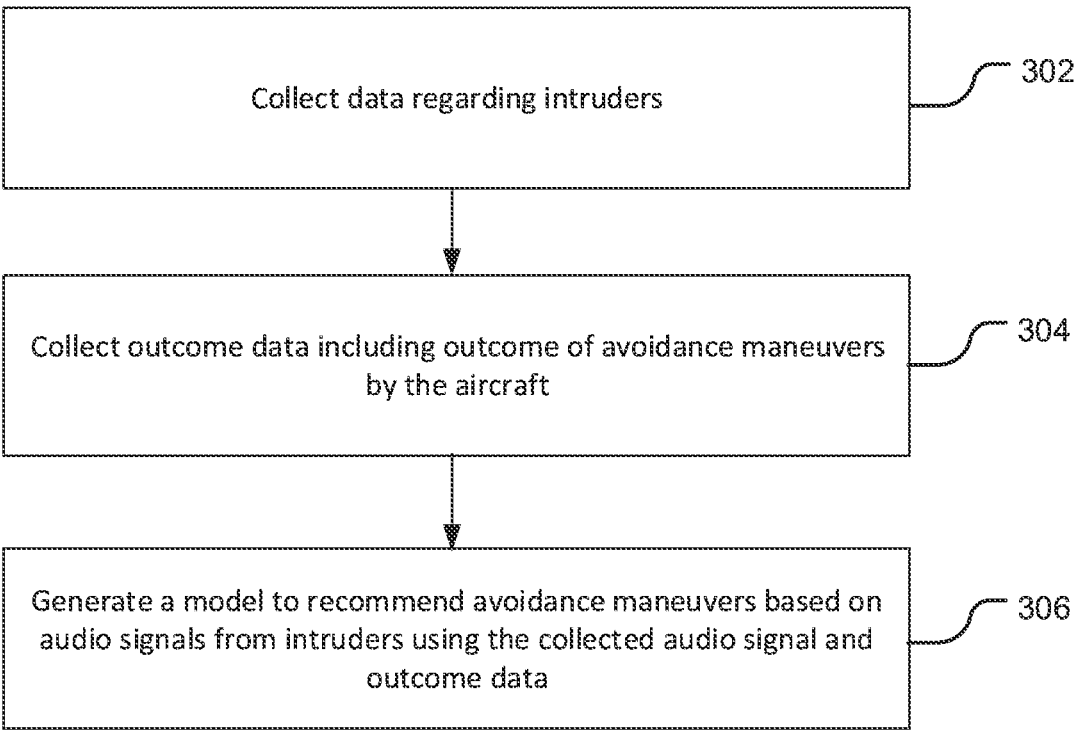
FIG. 5 is a flow diagram of example operations for generating a model of an example DAA system in accordance with particular embodiments.

FIG. 5 is a flow diagram of example steps for generating a model of an example avoidance determination system in accordance with particular embodiments. A first collecting operation 302 collects data regarding intruders moving relative to an aircraft. Data collected during the collection operation 302 may include simulation data, real-world flight data, test data, or any combination of various types of data. For example, simulation data may be generated using aircraft specific simulation software to simulate various flight paths of the aircraft 100 and intruders (e.g., the intruder 102). The simulation software may simulate execution of many avoidance maneuvers by the aircraft 100 in various flight simulations, where parameters such as aircraft 100 location, intruder location, aircraft 100 speed, weather conditions, airspace restrictions, flight conditions, fuel conditions, etc. can be varied to train the model to select an avoidance maneuver in many varied situations.

In some implementations, simulation data may be associated with audio data correlating with various aircraft. Such audio data may be collected, for example, using a ground based audio array or using an aircraft mounted audio array on a tracked flight. Such audio data may be provided as raw audio recordings, spectrograms, time domain signals, or other representations. Where a model is trained based on audio data in addition to location data, avoidance maneuvers may be selected based on data collected and analyzed by the acoustic detection system 118 without being associated with additional sensor data. Additionally, audio data may be used by the model during track generation 140, providing another data point for localization. In some implementations, the model may also use audio data to select information gathering maneuvers for the aircraft 100. For example, the aircraft 100 may maneuver to adjust the relationship of the microphone array relative to an intruder to strengthen the intruder signal for comparison to audio data used in training the model.

The collecting operation 302 may, in some implementations, also collect data regarding typical movements for different types of intruder aircraft, which may be obtained through flight plans, recorded flight data, or other sources. In some implementations, audio signals may also be correlated to different types of aircraft, such that the DAA system may predict a type of aircraft and the aircraft's movement based on the collected audio signal. Such audio data may be collected by a ground array, an aircraft mounted array, digital audio files, or other sources as available.

A second collecting operation 304 collects outcome data including outcome of avoidance maneuvers by the aircraft. For example, data collected by simulation software may include whether the avoidance maneuver keeps the avoidance zone 103 clear of intruders, results in collision, causes the aircraft 100 to lose too much altitude, or variance of the aircraft 100 from its flight plan due to the avoidance maneuver, among other data points. The data may be collected for various situations by varying flight parameters for the aircraft 100 and intruders, weather conditions, flight conditions, etc.

The second collecting operation 304 may also collect data regarding the impact of particular maneuvers on the acoustic detection system 118 of the aircraft 100. For example, some maneuvers may generate noise at the microphones 114*a-n*, decreasing the SNR enough that the acoustic detection system 118 is not reliable in detecting intruders. Accordingly, SNR of signals captured by the microphones 114a-n may be measured in response to various maneuvers and changes in flight plan. The data may be collected using an aircraft mounted microphone array during flight or using test data collected using, for example, a wind tunnel simulating various maneuvers for the aircraft 100. Models may be trained or generated to select maneuvers that reduce SNR less often or may be trained to incorporate mitigating adjustments (e.g., an adjustment to the roll of the aircraft 100 during descent) when selecting such maneuvers as avoidance maneuvers. Further, in some implementations, models used to initiate information gathering maneuvers used to generate location information about intruders may be trained using similar data about the effect of various maneuvers on SNR. Accordingly, information gathering maneuvers may be adjusted to ensure high SNR during the maneuvers.

A generating operation 306 generates a model to recommend avoidance maneuvers based on audio signals from intruders using the collected audio signal and outcome data. The generating operation 306 may use data collected in the collecting operation 302 and the second collecting operation 304 to generate or train a machine learning model. For example, the generating operation 306 may generate a deep neural network using the data collected in operations 302 and 304. In another implementation, the generating operation 306 may train a random forest classifier using the collected data. In some implementations, multiple models may be generated or trained during the generating operation 306 and may work together to implement avoidance maneuver selection 142. For example, a classifier may be trained to recommend a subset of avoidance maneuvers that will maintain SNR at the microphones 114a-n given wind conditions and a deep learning model may select an avoidance maneuver from the subset of avoidance maneuvers generated by the classifier. Other combinations and types of models may also be used for avoidance maneuver selection 142. Further, in some implementations, models generated during the generating operation 306 may also be used to implement track generation 140 or perform other tasks for the DAA system 105.

FIG. 6 is a flow diagram of example steps for monitoring functionality of audio probes of an aircraft based on a multichannel audio signal captured by the audio probes. In some implementations, pre-flight checks and calibrations of the audio probes may be used prior to the steps included in FIG. 6. For example, the functionality of the audio probes may be analyzed before flight by observing the audio signals received at the probes from a known audio source, such as the aircraft's own propeller, recorded audio patterns, or other audio sources. Further, the number of audio probes included in the system may allow for continued use of the DAA system 105 during flight even when one (or more) of the audio probes is not functioning properly. For example, the system may be calibrated or programmed to disregard signals from microphones that are not functioning properly as long as some number of microphones in the array are functioning properly.

A receiving operation 402 receives a multichannel audio signal at a plurality of audio probes of an aircraft. The receiving operation 402 may include any of the methods and systems described in U.S. Patent Application No. 63/082, 838, entitled "Acoustic Based Detection and Avoidance for Aircraft," which is hereby incorporated in its entirety.

An operation 404 determines whether the multichannel audio signal includes expected audio corresponding to the aircraft, such as a signal generated by one or more of the aircraft's own propellers during operation. Generally, a multichannel audio signal collected at the microphones 114a-n will include signals generated by intruders, environmental signals (e.g., wind or rain), and a constant signal generated by the aircraft 100. The signal generated by the aircraft 100 may then be used as a ground truth to evaluate the accuracy and working condition of the acoustic detection system 118. The operation 404 may compare the collected multichannel audio signal to the expected signal using, for example, image comparison between the collected signal and the expected signal. In some implementations, the aircraft 100 may perform maneuvers to adjust the relationship between the audio array and the intruder to obtain a stronger or clearer signal for comparison. The comparison may, in some implementations, compare the signals based on frequency, intensity, periodicity, or other characteristics to determine whether the signals match.

Where the multichannel audio signal does include the expected audio corresponding to the aircraft, an operation 408 uses the multichannel audio signal to detect the location of the intruder aircraft relative to the aircraft. Where the signal does include the expected signal, the acoustic detection system 118 is likely functioning properly and can be used, for example, to implement the operations described in FIG. 4. For example, where all of the microphones 114a-n are functioning correctly, the DAA system 105 can be used to estimate the location of an intruder 102, track the intruder 102 over time, and select maneuvers for the aircraft 100 to keep the avoidance zone 103 of the aircraft 100 clear of the intruder 102 by maintaining a separation distance between the aircraft 100 and the intruder 102.

Where the multichannel audio signal does not include the expected audio corresponding to the aircraft, a generating operation 406 generates a warning that one or more of the plurality of audio probes are not operating correctly or have failed. The DAA system 105 and the aircraft 100 may take various actions based on the generated warning. For example, in some implementations, the DAA system 105 may include functionality for determining which of the microphones 114a-n are not functioning properly and the DAA system 105 may continue to operate with a subset of the microphones 114a-n that are functioning as expected. The DAA system 105 may also, in some implementations, disable the acoustic detection system 118 and the aircraft 100 may continue its flight path using the additional detection system 120. While the acoustic detection system 118 is disabled, non-functional microphones may be rebooted or reset, in some cases. In some implementations, the aircraft 100 may change its flight path to land, turn around, or otherwise abort its flight responsive to the warning generated by the operation 406.

In some implementations, the DAA system 105 may use a variable beamforming approach to process signals from the operating microphones while ignoring signals from microphones that are not operating correctly. For example, the DAA system 105 may "skip" or disregard signals from microphones that are not operating properly and continue with audio detection using functional microphones.

Figure 7:
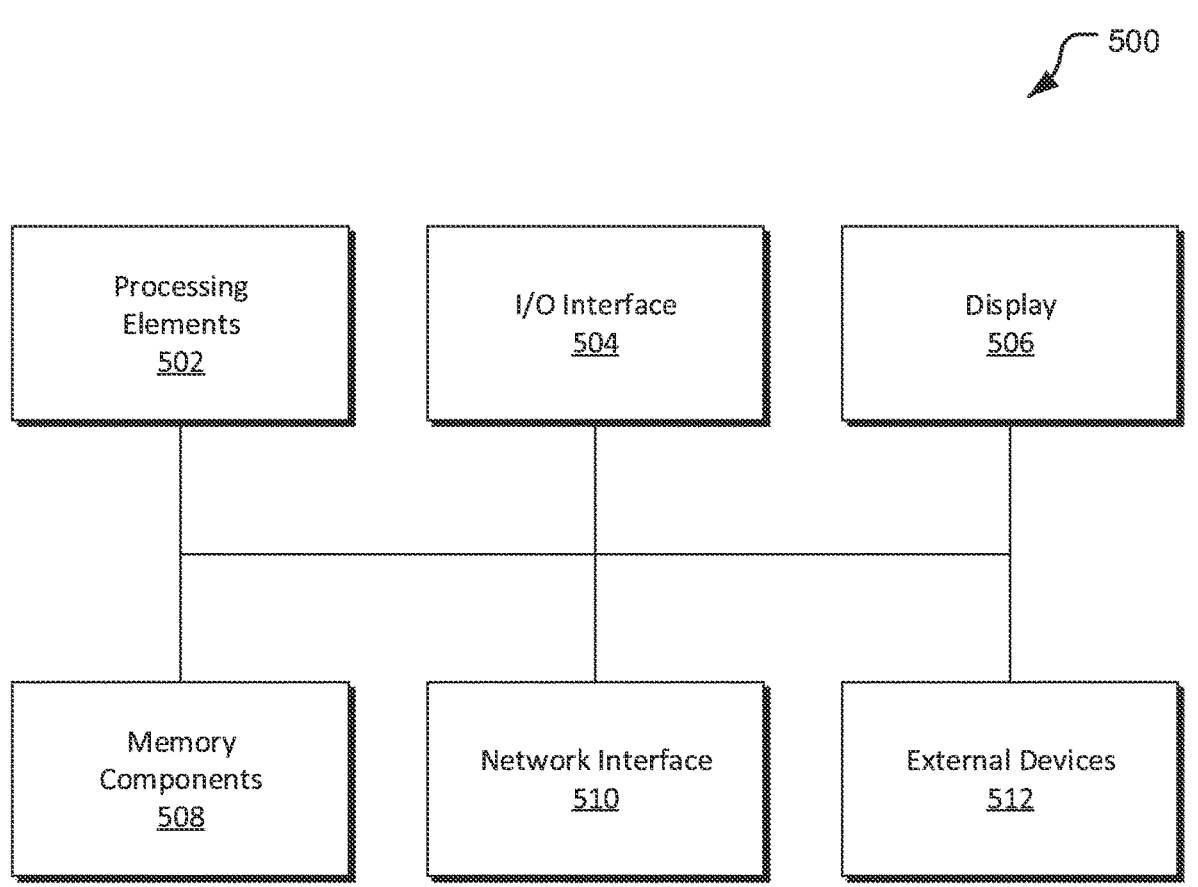
FIG. 7 is a schematic diagram of an example computer system implementing various embodiments in the examples described herein.

FIG. 7 is a schematic diagram of an example computer system 500 for implementing various embodiments in the examples described herein. A computer system 500 may be used to implement the DAA node 106 (in FIG. 2) or integrated into one or more components of the aircraft control system 104. For example, the acoustic detection system 118 and/or avoidance determination 122 may be implemented using one or more of the components of the computer system 500 shown in FIG. 7. The computer system 500 is used to implement or execute one or more of the components or operations disclosed in FIGS. 1-6. In FIG. 7, the computer system 500 may include one or more processing elements 502, an input/output interface 504, a display 506, one or more memory components 508, a network interface 510, and one or more external devices 512. Each of the various components may be in communication with one another through one or more buses, communication networks, such as wired or wireless networks.

The processing element 502 may be any type of electronic device capable of processing, receiving, and/or transmitting instructions. For example, the processing element 502 may be a central processing unit, graphics processing unit, microprocessor, processor, or microcontroller. Additionally, it should be noted that some components of the computer 500 may be controlled by a first processor and other components may be controlled by a second processor, where the first and second processors may or may not be in communication with each other.

The memory components 508 are used by the computer 500 to store instructions for the processing element 502, as well as store data, such as multichannel audio data, intruder tracks and the like. The memory components 508 may be, for example, magneto-optical storage, read-only memory, random access memory, erasable programmable memory, flash memory, or a combination of one or more types of memory components.

The display 506 provides visual feedback to a user. Optionally, the display 506 may act as an input element to enable a user to control, manipulate, and calibrate various components of the DAA node 106 or the aircraft control 104 as described in the present disclosure. The display 506 may be a liquid crystal display, plasma display, organic light-emitting diode display, and/or other suitable display. In embodiments where the display 506 is used as an input, the display may include one or more touch or input sensors, such as capacitive touch sensors, a resistive grid, or the like.

The I/O interface 504 allows a user to enter data into the computer 500, as well as provides an input/output for the computer 500 to communicate with other devices or services. The I/O interface 504 can include one or more input buttons, touch pads, and so on.

The network interface 510 provides communication to and from the computer 500 to other devices. The network interface 510 includes one or more communication protocols, such as, but not limited to WiFi, Ethernet, Bluetooth, and so on. The network interface 510 may also include one or more hardwired components, such as a Universal Serial Bus (USB) cable, or the like. The configuration of the network interface 510 depends on the types of communication desired and may be modified to communicate via WiFi, Bluetooth, and so on.

The external devices 512 are one or more devices that can be used to provide various inputs to the computing device 500, e.g., mouse, microphone, keyboard, trackpad, or the like. The external devices 512 may be local or remote and may vary as desired. In some examples, the external devices 512 may also include one or more additional sensors.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method comprising:

receiving, at an acoustic detection system of an aircraft, audio signals, to provide a multichannel audio signal, wherein the acoustic detection system comprises two or more microphones, and wherein the audio signals are received by the acoustic detection system when the aircraft is traveling along a flight path based on an original flight plan:

determining, by one or more processors of the acoustic detection system, based on the multichannel audio signal, that the multichannel audio signal is associated with at least one intruding aircraft;

detecting, based on the multichannel audio signal, a second signal collected by a sensor of the aircraft, the second signal providing location information about the intruding aircraft;

based on the multichannel audio signal, the second signal, and the flight path, generating a plurality of possible maneuvers for the aircraft;

selecting a maneuver out of the plurality of possible maneuvers for execution by the aircraft to increase information detectable by the acoustic detection system, wherein the information is about the at least one intruding aircraft; and commanding the maneuver for the aircraft based on the multichannel audio signal and the second signal, wherein the maneuver comprises a change in positioning of the aircraft relative to the intruding aircraft to change characteristics of the multichannel audio signal to obtain additional location information about the intruding aircraft, and wherein the maneuver further comprises a return to the flight path based on the original flight plan.

2. The method of claim 1, wherein selecting the maneuver of the plurality of possible maneuvers comprises:

selecting the maneuver for the aircraft using a machine learning model, wherein the machine learning model receives at least a track of the intruding aircraft as input, wherein the track is generated from two or more location estimations of the intruding aircraft.

3. The method of claim 2, wherein the machine learning model is a deep learning network generated using simulated flight data for the aircraft.

4. The method of claim 2, wherein the track of the intruding aircraft is generated based on an acoustic location estimation for the intruding aircraft, wherein the acoustic location estimation is generated using the multichannel audio signal.

5. The method of claim 4, wherein the acoustic location estimation is generated by the machine learning model using an input based on the multichannel audio signal.

6. The method of claim 1, wherein determining that the multichannel audio signal is associated with at least one intruding aircraft comprises determining that the multichannel audio signal is associated with the intruding aircraft and a second intruding aircraft, wherein commanding the maneuver is further based on a track of the second intruding aircraft generated based on the multichannel audio signal and additional information about the second intruding aircraft.

7. The method of claim 1, wherein the maneuver is selected by the acoustic detection system to increase or maintain a signal to noise ratio of the multichannel audio signal.

8. The method of claim 1, wherein generating the plurality of possible maneuvers for the aircraft comprises generating a maneuver configured to avoid the at least one intruding aircraft and gather information of the at least one intruding aircraft.

9. The method of claim 1, wherein selecting the plurality of possible maneuvers for the aircraft comprises selecting a maneuver based further on at least one of a weather data, flight condition, airspace restriction, and fuel level of the aircraft.

10. The method of claim 1, wherein selecting the maneuver out of the plurality of possible maneuvers for execution by the aircraft to increase information detectable by the acoustic detection system, wherein the information is about the at least one intruding aircraft, comprises:

assigning a score for each maneuver of the plurality of possible maneuvers, wherein a higher score indicates a higher amount of information about the at least one intruding aircraft detectable by the acoustic detection system of the at least one intruding aircraft during execution of the maneuver; and selecting a maneuver of the plurality of possible maneuvers with the highest generated score.

11. The method of claim 10, wherein selecting the maneuver of the plurality of possible maneuvers further comprises:

evaluating whether each maneuver of the plurality of possible maneuvers will cause the aircraft to avoid the at least one intruding aircraft when executed by the aircraft; and selecting a maneuver of the plurality of possible maneuvers that will cause the aircraft to avoid the at least one intruding aircraft.

12. The method of claim 10, wherein assigning the score for each maneuver of the plurality of possible maneuvers comprises assigning the score using a machine learning model, wherein the machine learning model is trained to classify the amount of information detectable by the acoustic detection system, wherein the information is about the at least one intruding aircraft, during execution of a maneuver.

13. The method of claim 1, wherein determining that the multichannel audio signal is associated with at least one intruding aircraft comprises:

processing the multichannel audio signal; and determining the location of the source of the multichannel audio signal using a localization machine learning model.

14. The method of claim 13, wherein processing the multichannel audio signal comprises transforming the multichannel audio signal to the frequency domain to obtain frequency data of the multichannel audio signal.

15. The method of claim 13, wherein the localization machine learning model is trained on labeled multichannel audio and directional data.

16. The method of claim 1, wherein determining that the multichannel audio signal is associated with at least one intruding aircraft comprises:

analyzing the multichannel audio signal to determine a class of the at least one intruding aircraft; and determining a track of the at least one intruding aircraft based on the multichannel audio signal.

17. The method of claim 16, wherein analyzing the multichannel audio signal to determine a class of the at least one intruding aircraft comprises:

analyzing multichannel audio signal to determine a probability that the signal is associated with a class of aircraft; and determining a flight characteristic associated with the class of aircraft.

18. The method of claim 16, wherein determining the track of the at least one intruding aircraft comprises:

determining a state estimation of the at least one intruding aircraft based on the multichannel audio signal; and generating a track of the at least one intruding aircraft based on the state estimation of the at least one intruding aircraft and the class of the at least one intruding aircraft.

19. The method of claim 16, wherein determining the track of the at least one intruding aircraft comprises:

generating acoustic directional information corresponding to the at least one intruding aircraft using the multichannel audio signal; and generating a track of the at least one intruding aircraft using the acoustic directional information and the second signal.

* * * * *